United States Patent [19]

Wagner

[11] Patent Number: 4,967,059
[45] Date of Patent: Oct. 30, 1990

[54] ELECTRICAL SOLDERING GUN WITH HINGED SOLDERING JAWS HEATED BY A SINGLE HEATING ELEMENT

[75] Inventor: Rudolf Wagner, Stuttgart, Fed. Rep. of Germany

[73] Assignee: Rems-Werk Christian Föll und Söhne GmbH & Co., Stuttgart, Fed. Rep. of Germany

[21] Appl. No.: 189,300

[22] Filed: Mar. 17, 1988

[30] Foreign Application Priority Data

Mar. 17, 1987 [DE] Fed. Rep. of Germany ....... 3708587

[51] Int. Cl.$^5$ .......................... H05B 1/00; B23K 3/04; B23K 1/12
[52] U.S. Cl. ...................................... 219/230; 81/345; 81/383; 219/225; 228/51
[58] Field of Search ............... 219/225, 226, 230, 231, 219/533; 81/345, 383; 228/51-55, 57

[56] References Cited

U.S. PATENT DOCUMENTS

| 933,318 | 9/1909 | Marshall | 219/230 X |
|---|---|---|---|
| 1,616,121 | 2/1927 | Gruber | 81/345 X |
| 1,845,475 | 2/1932 | Benson | 219/230 X |
| 2,001,538 | 5/1935 | Mueller et al. | 219/230 X |
| 2,167,599 | 7/1939 | Yanits | 81/383 X |
| 2,226,194 | 12/1940 | Berolsky | 219/230 X |
| 2,258,844 | 10/1941 | Brown et al. | 219/230 X |
| 2,469,877 | 5/1949 | Haberman | 228/51 X |
| 2,514,736 | 7/1950 | Zama et al. | 219/230 |
| 2,517,275 | 8/1950 | Bartrug | 81/345 |
| 2,518,994 | 8/1950 | Miller | 81/345 |
| 2,751,485 | 6/1956 | Sauer | 219/230 X |
| 3,339,059 | 8/1967 | Spinka | 219/530 X |
| 3,412,233 | 11/1968 | Wilkie | 219/230 |
| 4,626,658 | 12/1986 | Gray et al. | 219/230 |

FOREIGN PATENT DOCUMENTS

| 1765867 | 3/1972 | Fed. Rep. of Germany | 219/230 |
|---|---|---|---|
| 967604 | 4/1951 | France | 219/230 |
| 480374 | 2/1938 | United Kingdom | 219/230 |
| 1085972 | 10/1967 | United Kingdom | 219/230 |
| 2000948 | 1/1979 | United Kingdom | 219/230 |
| 2124124 | 2/1984 | United Kingdom | 219/230 |
| 2147233 | 5/1985 | United Kingdom | 219/230 |
| 2163081 | 2/1986 | United Kingdom | 228/57 |

Primary Examiner—Anthony Bartis
Attorney, Agent, or Firm—Robert W. Becker & Associates

[57] ABSTRACT

An electrical soldering gun for pipe soldering has a plastic case with a pistol grip handle and a single elongated electric heating element extending longitudinally of the case. A first soldering jaw with recesses is disposed on and extends axially of the heating element and has directly hingedly connected in heat exchange relationship therewith with a second jaw provided with complementary recesses for cooperating with the first jaw recesses to receive and grip a pipe to be soldered. The second jaw is connected to a slidable trigger on the casing by a pull rod for manually pivotally moving the second jaw away from the first jaw against the force of a spring associated with the trigger normally biasing the push rod and second jaw toward the first jaw.

10 Claims, 1 Drawing Sheet

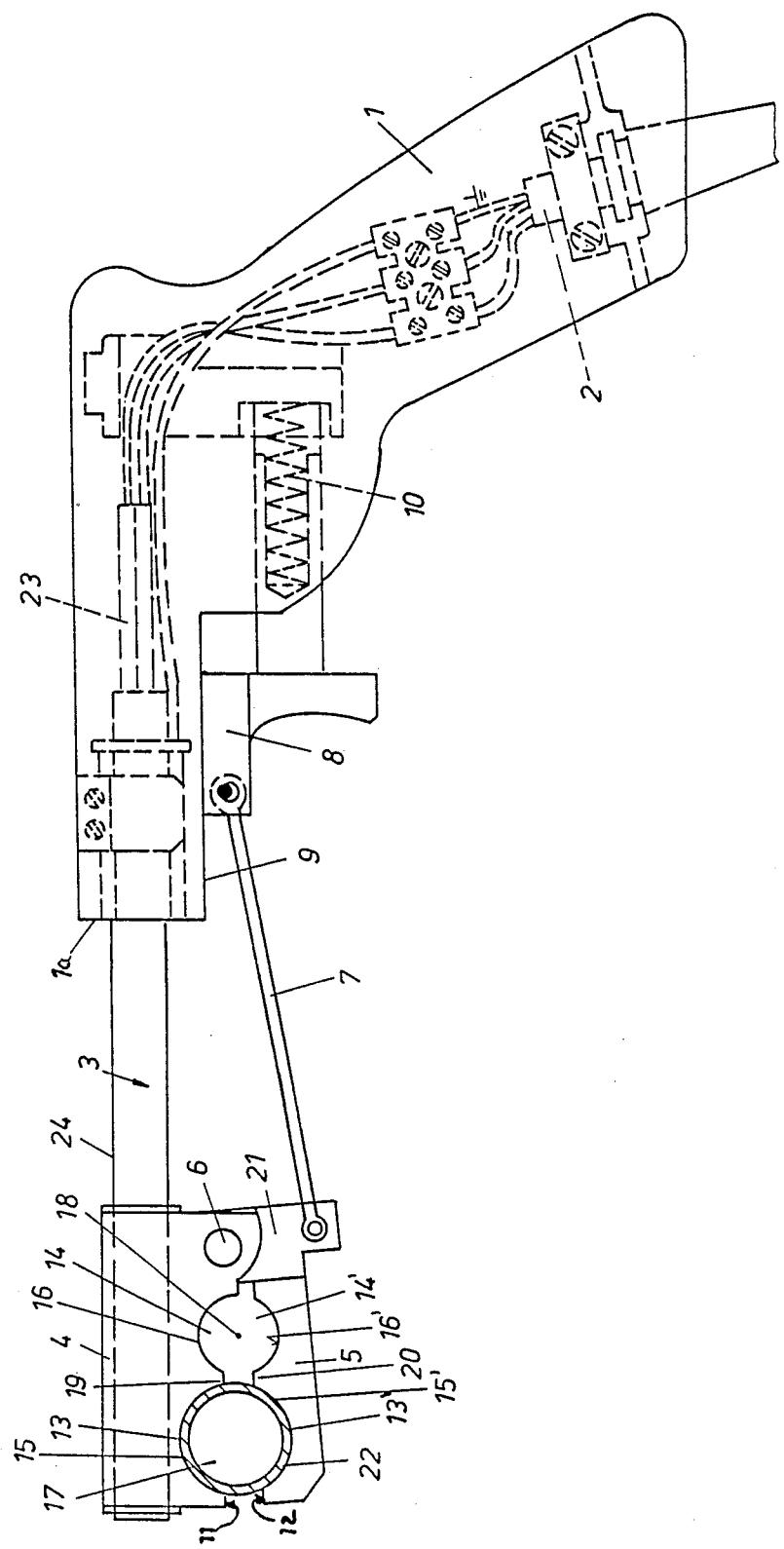

ELECTRICAL SOLDERING GUN WITH HINGED SOLDERING JAWS HEATED BY A SINGLE HEATING ELEMENT

BACKGROUND OF THE INVENTION

The present invention relates to an electrical soldering device that includes a heating cartridge or element on which is disposed a soldering jaw that is provided with recess means that cooperates with recess means of a further soldering jaw to form, in a gripping position, receiving means for a pipe that is to be soldered.

Electrical soldering devices of this type are used, especially in the plumbing industry, to solder copper pipes. The soldering device of the aforementioned general type is embodied as a clamp, with each of the ends of the clamp parts being provided with a heating cartridge or element, each of which is provided with a soldering jaw. The two parts of the clamp are pressed together during soldering of a pipe, so that the pipe that is to be soldered is disposed in the receiving means formed by the two recesses of the soldering jaws. Via the heating elements, the two soldering jaws, and hence also the pipe, are heated up, so that a suitable solder can then be applied to the pipe in a manner known per se. As a consequence of the presence of the two heating elements, this heretofore known soldering device has a complicated construction, and is expensive to manufacture. In addition, this known soldering device is relatively large due to the presence of two heating elements.

It is therefore an object of the present invention to provide an electrical soldering device that has a compact design and a structurally straightforward configuration.

SUMMARY OF THE INVENTION

The soldering device of the present invention comprises: a housing, a heating element, a first soldering jaw that is disposed on the heating element and is provided with first recess means, a second soldering jaw that is hingedly connected to the first soldering jaw and is provided with second recess means, with the first and second recess means cooperating, in a gripping position of the second soldering jaw, to form receiving means for a pipe that is to be soldered, a control member that is movably mounted on the housing, and a connecting element that is connected to the second soldering jaw and to the control member in such a way that the gripping position of the second soldering jaw can be adjusted.

With the inventive soldering device, the two soldering jaws are pivotably interconnected. As a result, a single heating cartridge or element only is necessary in order to heat up the two soldering jaws to the required temperature. The transfer of heat from the soldering jaw that is disposed on the heating element to the pivotable soldering jaw is effected via the pivot or hinge connection. Since the inventive soldering device is provided with only a single heating element for both of the soldering jaws, the inventive soldering device has a compact construction and is economical to manufacture. Without adversely affecting the compact construction of the inventive soldering device, the single heating element can have a relatively large diameter, so that the inventive soldering device has an output that is great enough to satisfactorily solder the pipes that are placed between the two soldering jaws.

Further specific features of the present invention will be described in detail subsequently.

BRIEF DESCRIPTION OF THE DRAWING

This object, and other objects and advantages of the present invention, will appear more clearly from the following specification in conjunction with the accompanying schematic drawing, the sole view of which is a side view of one exemplary embodiment of the inventive electrical soldering device.

DESCRIPTION OF PREFERRED EMBODIMENTS

Referring now to the drawing in detail, the illustrated electrical soldering device serves for the soldering of pipes or tubes, especially copper pipes such as are typically used in the plumbing industry. The soldering device has a housing 1 that simultaneously serves as a handle or grip for the soldering device. The housing or grip 1 is preferably embodied as a pistol grip, so that the soldering device can be handled extremely easily and comfortably by the user. The housing is preferably made of plastic, especially of an electrically insulating plastic. An electrical supply line or lead 2 is guided into the housing 1. A tubular, so-called heating cartridge 3 extends out of the end 1a of the housing 1. At least one heating wire 23 extends in the heating cartridge or element 3; this heating wire 23 is connected in a known manner with the electrical lead 2 in an electrically conducting manner. Seated on the free end of the heating element 3 is a soldering jaw 4 to which is hinged a further soldering jaw 5. The two soldering jaws 4 and 5 are connected to one another via a pivot shaft 6 that is provided in the region of that end of the two soldering jaws that faces the housing 1. The pivotable soldering jaw 5 is hingedly connected to a push-pull rod 7, the other end of which is hingedly connected to a control member 8. The latter is preferably embodied as a sliding element that is displaceably mounted in a non-illustrated guide on the underside 9 of the housing 1. The control member 8 is under the force of at least one compression spring 10, which is accommodated in the housing 1.

In the illustrated embodiment, those sides 11 and 12 of the two soldering jaws 4 and 5 that face one another are provided with each thereof having two partially circular recesses 13, 14 and 13', 14' respectively. These recesses are of different sizes, with each recess having a partially circular, curved bottom 15, 15', 16, 16'. Each of the bottoms extends over less than 180°, so that when the soldering jaws 4 and 5 are closed, the receiving openings 17 and 18 that are formed by the recesses have a non-circular contour. The adjacent recesses 13, 14 and 13', 14' in the two soldering jaws 4 and 5 are respectively separated from one another by a land 19 and 20.

The pivotable soldering jaw 5 is provided with an extension 21 via which the jaw 5 extends into a slot provided on that end of the soldering jaw 4 that faces the housing 1. In addition, the push-pull or connecting rod 7 is hingedly connected to the extension 21. In the closed position (with no pipes inserted), the facing sides 11 and 12 of the soldering jaws 4 and 5 rest against one another.

The soldering jaw 4 is disposed on the heating cartridge or element 3 in such a way that it cannot shift in the axial direction. The soldering jaw 4 can be removably disposed upon the heating element 3, so that if necessary, the jaw 4 can be replaced. The heating element 3 can also be removably secured in the housing 1.

The two soldering jaws 4 and 5 are made of copper that is preferably nickel-plated or chrome-plated in order to prevent scaling during soldering. The pivot shaft 6 is also made of copper that is preferably nickel-plated or chrome-plated.

To solder pipes or tubes 22, the control member 8 is first pushed back against the force of the compression spring 10. Via the connecting rod 7, the soldering jaw 5 is pivoted about the shaft 6 into its open position, so that the pipe 22 that is to be soldered can be easily placed into the appropriate receiving opening 17 or 18. Subsequently, the control member 8 can be released, whereupon it is pushed back by the compression spring 10. In so doing, the soldering jaw 5 is pivoted into its gripping position via the connecting rod 7, so that the pipe 22 is secured in position in the appropriate receiving opening 17 or 18. Since the soldering jaw 5 is urged in the direction toward its gripping or closed position via the spring force, the control member 8 can be released during the soldering process.

The soldering device can be provided with a non-illustrated on and off switch, which would be activated after the pipe 22 has been clamped in. Normally, however, the plug of the electrical lead 2 is merely inserted into an outlet, thus immediately switching on the soldering device. The heating wire 23 is heated up after the soldering device has been switched on, as a result of which the metallic tube 24 of the heating element 3 is also heated up. As a result, the soldering jaw 4, which is securely disposed on the heating element 3, is similarly heated up. Via the pivot shaft 6, the pivotable soldering jaw 5 is also heated up. Since the inventive soldering device has only a single heating cartridge or element 3, the latter can also have a large diameter while maintaining a compact construction of the overall soldering device, so that the latter can also have a high output or power. As a result, the soldering jaws 4 and 5 can be heated without difficulty to the required soldering temperature. The pipe 22 that is to be soldered need not be entirely surrounded by the soldering jaws 4 and 5; this feature is illustrated in the drawing. The soldering jaws 4 and 5 can be heated to such a temperature that despite the fact that the pipe 22 is not completely surrounded, a satisfactory soldering is possible. The pivot shaft 6 permits a satisfactory transfer of heat to the soldering jaw 5, so that in every case the jaw 5 has a temperature that is high enough to assure satisfactory soldering.

Due to the different sizes of the receiving openings 17 and 18, it is possible with the soldering device of the present invention to solder different sizes of pipes without changing the soldering jaws 4 and 5. Since the bottoms 15, 15', 6, 16' of the recesses 13, 13', 14, 14' extend over less than 180°, pipes of different diameters can be secured in the receiving openings 17 and 18. Thus, pipes having various larger diameters can be placed in the larger receiving opening 17, and pipes having various smaller diameters can be placed in the receiving opening 18. The two receiving openings 17 and 18 are preferably embodied in such a way that pipes having the currently available diameters can be placed in these openings.

Since the soldering device of the present invention has only a single heating cartridge or element 3, this soldering device can also be manufactured economically.

Pursuant to one straightforward embodiment of the present invention, the two soldering jaws 4 and 5 are embodied with only a single receiving opening, the bottoms of which preferably also extend over less than 180°, so that pipes of various diameters within a prescribed range can be placed in this receiving opening.

The present invention is, of course, in no way restricted to the specific disclosure of the specification and drawing, but also encompasses any modifications within the scope of the appended claims.

What I claim is:

1. An electrical soldering device for pipes comprising:
   a housing having an overall configuration like a pistol;
   a single elongated heating element connected to said housing in a location extending longitudinally thereof;
   a first soldering jaw that is disposed on said heating element and extended axially of said heating element in heat exchange relationship therewith and is provided with first recess means for receiving pipes therein to be soldered;
   a second soldering jaw that is hingedly connected directly to said first soldering jaw per se for heat transmittal where hingedly connected between said first and second jaws and is provided with second recess means also for receiving pipes therein to be soldered, with said first and second recess means cooperating, in a gripping position of said second soldering jaw, to form complementary receiving means for a pipe that is to be soldered;
   a control member that is movably mounted on said housing; and
   a connecting element that is connected directly at opposite ends thereof both to said second soldering jaw and also to said control member, biasing means operatively associated with at least one of said control member, connecting element and second jaw for normally biasing said second jaw toward said first jaw to maintain said second jaw in its gripping position to hold the pipe to be soldered, said second jaw being selectively movable away from said first jaw by actuating of said control member to cause said connection element to pivotally move said second jaw.

2. A soldering device according to claim 1, in which said biasing means is a compression spring that is mounted in said housing and acts upon said control member.

3. A soldering device according to claim 2, in which said connecting element is a push-pull rod that is hingedly connected to said second soldering jaw and to said control member.

4. A soldering device according to claim 3, in which said control member is a sliding element.

5. A soldering device according to claim 1, in which said first and second recess means have bottoms that respectively extend over an arc of less than 180°.

6. A soldering device according to claim 1, in which said first and second recess means each comprise at least one recess.

7. A soldering device according to claim 6, in which said first and second recess means each comprise at least two recesses.

8. A soldering device according to claim 1, in which said second soldering jaw is hingedly connected to said first soldering jaw via a pivot shaft.

9. A soldering device according to claim 8, in which said first soldering jaw, said pivot shaft, and said second soldering jaw are made of copper.

10. A soldering device according to claim 1, in which a biasing spring engages said control member and is installed in said housing.

* * * * *